United States Patent
Böhm

(10) Patent No.: US 9,511,752 B2
(45) Date of Patent: Dec. 6, 2016

(54) METHOD FOR OPERATING A BRAKE SYSTEM, AND BRAKE SYSTEM

(75) Inventor: Jürgen Böhm, Oberneisen (DE)

(73) Assignee: CONTINENTAL TEVES AG & CO. OHG, Frankfurt (DE)

( * ) Notice: Subject to any disclaimer, the term of this patent is extended or adjusted under 35 U.S.C. 154(b) by 0 days.

(21) Appl. No.: 14/124,490

(22) PCT Filed: Apr. 16, 2012

(86) PCT No.: PCT/EP2012/056897
§ 371 (c)(1),
(2), (4) Date: Jun. 10, 2014

(87) PCT Pub. No.: WO2012/167980
PCT Pub. Date: Dec. 13, 2012

(65) Prior Publication Data
US 2014/0303865 A1    Oct. 9, 2014

(30) Foreign Application Priority Data
Jun. 9, 2011   (DE) .................. 10 2011 077 313

(51) Int. Cl.
*B60T 8/17* (2006.01)
*B60T 13/74* (2006.01)
(Continued)

(52) U.S. Cl.
CPC .................. *B60T 8/17* (2013.01); *B60T 8/326* (2013.01); *B60T 13/58* (2013.01); *B60T 13/745* (2013.01);
(Continued)

(58) Field of Classification Search
CPC ............ B60T 8/17; B60T 8/171; B60T 8/172; B60T 8/1725; B60T 13/58; B60T 8/326; B60T 13/745; B60T 2270/82; B60T 2270/402; B60T 8/52; B60T 8/54; B60T 8/32
See application file for complete search history.

(56) References Cited

U.S. PATENT DOCUMENTS 5,051,907 A * 9/1991 Kuwana et al. ................ 701/79
5,248,191 A * 9/1993 Kondo et al. ............. 303/117.1
(Continued)

FOREIGN PATENT DOCUMENTS

DE    10 2009 033 499 A1    1/2010
DE    10 2009 088 944 A1    8/2010
(Continued)

OTHER PUBLICATIONS

German Examination Report—Aug. 31, 2012.
PCT International Search Report.

*Primary Examiner* — Jerrah Edwards
*Assistant Examiner* — Tamara Weber
(74) *Attorney, Agent, or Firm* — Brinks Gilson & Lione

(57) ABSTRACT

The invention relates to a method for operating a brake system, in particular for motor vehicles, having an electrically controllable pressure supplying device for hydraulically actuating at least one wheel brake. The pressure supplying device includes a cylinder-piston arrangement with a hydraulic pressure chamber. The piston of the cylinder-piston arrangement being movable by an electromechanical actuator in order to generate a specificable target pressure in the hydraulic pressure chamber. An actuator torque and an actuator position of the electromechanical actuator are ascertained, and a pressure value for the pressure in the hydraulic pressure chamber is determined using the actuator toque and the actuator position taking into consideration a pressure model.

13 Claims, 2 Drawing Sheets

(51) Int. Cl.
*B60T 8/32* (2006.01)
*B60T 13/58* (2006.01)

(52) U.S. Cl.
CPC ....... *B60T 2270/402* (2013.01); *B60T 2270/82* (2013.01)

(56) References Cited

U.S. PATENT DOCUMENTS

| | | | |
|---|---|---|---|
| 5,249,848 A * | 10/1993 | Matsuto et al. | 303/163 |
| 2002/0027388 A1* | 3/2002 | Tanaka et al. | 303/150 |
| 2003/0160505 A1* | 8/2003 | Riddiford et al. | 303/115.2 |
| 2003/0214177 A1* | 11/2003 | Kusano et al. | 303/113.1 |
| 2006/0087175 A1* | 4/2006 | Nakaoka et al. | 303/121 |
| 2007/0001629 A1* | 1/2007 | McGarry et al. | 318/52 |
| 2007/0188015 A1* | 8/2007 | Sato | B60T 8/4059 303/11 |
| 2009/0228181 A1* | 9/2009 | Luders et al. | 701/67 |
| 2010/0256847 A1* | 10/2010 | Kimbara et al. | 701/22 |
| 2011/0115282 A1* | 5/2011 | Dinkel | B60T 7/042 303/3 |
| 2011/0118920 A1* | 5/2011 | Kim | B60K 6/48 701/22 |
| 2011/0291469 A1* | 12/2011 | Drumm | 303/2 |

FOREIGN PATENT DOCUMENTS

| | | |
|---|---|---|
| DE | 10 2012 200 705 A1 | 8/2012 |
| WO | WO 2006/111393 A1 | 10/2006 |
| WO | WO 2011/029812 A1 | 3/2011 |
| WO | WO2011/154369 A1 | 12/2011 |

* cited by examiner

METHOD FOR OPERATING A BRAKE SYSTEM, AND BRAKE SYSTEM

CROSS REFERENCE TO RELATED APPLICATIONS

This application claims priority to German Patent Application No. 10 2011 077 313.4, filed Jun. 9, 2011 and PCT/EP2012/056897, filed Apr. 16, 2012.

FIELD OF THE INVENTION

The invention relates to a method for operating a motor vehicle brake system and to a brake system.

BACKGROUND

In motor vehicle technology, "brake-by-wire" brake systems are becoming increasingly widespread. Such brake systems often has not only a master brake cylinder which can be activated by the vehicle driver but also an electrically controllable pressure supplying device by means of which the wheel brakes or the master brake cylinder are activated in the "brake-by-wire" operating mode. In order to give the vehicle driver a pleasant pedal sensation in the "brake-by-wire" operating mode, the brake systems usually includes a brake pedal sensation-simulating device. In these brake systems, the wheel brake can be activated on the basis of electronic signals even without active intervention by the vehicle driver. These electronic signals can be output, for example, by an electronic stability program or an adaptive cruise control system.

International Patent Application WO 2011/029812 A1 discloses a "brake-by-wire" brake system having a pressure supplying device having a hydraulic cylinder-piston arrangement, one piston of which can be activated by an electric motor with the intermediate connection of a rotational-translational transmission. The pressure supplying device is connected hydraulically to a pressure modulation unit which has one inlet valve and outlet valve per wheel brake. The brake system has a pressure sensor for measuring the generated pressure (brake system pressure) of the pressure supplying device. In the above-referenced application, there are no further details on how setting or adjustment of a predefined setpoint value is to be carried out for the pressure of the pressure supplying device. In particular, there is no mention of how a set brake pressure is checked if the pressure sensor fails.

The object of the present invention is therefore to make available a brake system and a method for operating a brake system having an electrically controllable pressure supplying device which has a cylinder-piston arrangement with a hydraulic pressure chamber, the piston of which can be activated by an electromechanical actuator in order to generate a pressure in the pressure chamber, which permits reliable and correct setting of a desired pressure. This object is achieved according to the invention by means of a method and a brake system according to the description of the present invention.

SUMMARY

The invention is based on the idea of determining the pressure of a cylinder-piston arrangement with a hydraulic pressure chamber, the pistons of which can be moved by an electromechanical actuator in order to generate a pressure in the hydraulic pressure chamber, from at least two variables of the electromechanical actuator which can be detected reliably, specifically an actuator torque and an actuator position, taking into account a pressure model.

The proposed method provides the advantage that the pressure value which is estimated on the basis of the pressure model is available even if a pressure sensor which is provided for measuring the pressure does not supply a signal, for example owing to a defect or because the measuring range of the pressure sensor is exceeded. If means for detecting the actuator torque and the actuator position are already present in the brake system for other reasons, the method according to the invention can be implemented cost-effectively in an open-loop or closed-loop control unit of the brake system, for example without further sensors.

According to one preferred embodiment of the method according to the invention, the pressure value, which is determined using the actuator torque and the actuator position, is used as an actual pressure for setting or adjusting a predefined setpoint pressure of the pressure supplying device. For this purpose, the actual pressure and the setpoint pressure are particularly preferably fed to a pressure regulator which outputs an actuation signal for the electromechanical actuator.

According to one development of the method according to the invention, the pressure in the hydraulic pressure chamber is additionally measured by means of a pressure sensor. The measured values of the pressure sensor should advantageously be present at least temporarily or when a condition is met, for example in the case of low pressures, so that it is possible to check or adapt the pressure model which is used.

At least one parameter of the pressure model is preferably determined or adapted on the basis of the measured pressure of the pressure supplying device, the detected actuator torque and the detected actuator position ($\phi_{actr}$). According to one development of the invention, the parameter or parameters for the pressure model is/are determined or adapted if the measured pressure is lower than or equal to a first threshold value, since then reliable measured values of the pressure sensor can be expected. If the measured pressure value is higher than the first threshold value, the parameter or parameters of the pressure model is/are maintained. The pressure can then be calculated on the basis of the pressure model.

When two or more parameters of the pressure model are to be adapted, preferably only one of the parameters is ever changed at a time or in a time interval during the adaptation of the parameters. In addition, the extent of the change of the parameter is particularly preferably predefined.

The measured pressure of the pressure supplying device is advantageously used as an actual pressure for setting or adjusting the setpoint pressure as long as the measured pressure value is lower than or equal to a second threshold value. In this pressure range of low pressures, the measured pressure has the highest level of accuracy, assuming that the pressure sensor is functionally capable.

According to a further preferred embodiment of the method according to the invention, an actual pressure value is calculated from the measured pressure of the pressure supplying device and the pressure value which is determined from the actuator torque and actuator position, which actual pressure value is used as an actual pressure for setting or adjusting the predefined setpoint pressure. The actual pressure value is particularly preferably calculated by weighted averaging with a weighting factor from the measured pressure value and the determined pressure value, wherein the weighting factor is selected as a function of the measured pressure and a measuring range end value of the pressure sensor.

If the measured pressure value or the calculated pressure value is higher than a third threshold value, according to one development of the invention the pressure value, which is determined from the actuator torque and actuator position on the basis of the pressure model, is used as an actual pressure for setting or adjusting the setpoint pressure.

The third threshold value is preferably selected to be lower than a measuring range end value of the pressure sensor. As a result, even before the measuring range end value of the pressure sensor is reached switching over occurs to a control process based solely on the pressure value calculated from the two actuator variables.

The pressure value which is determined from the actuator torque and actuator position is preferably used as an actual pressure for setting or adjusting the setpoint pressure if a failure of the pressure sensor is detected or there is no measured pressure available since otherwise sufficiently precise control of the pressure would not be possible.

The pressure of the pressure supplying device is preferably used for service brake activation of the brakes or brake system.

The wheel brake or brakes is/are preferably connected hydraulically to the pressure chamber of the cylinder-piston arrangement. An electrically operated inlet valve is particularly preferably arranged between a wheel brake, in particular each wheel brake, and the pressure chamber, with which inlet valve the wheel brake can be hydraulically disconnected from the pressure chamber.

A wheel brake, in particular each wheel brake, can preferably be connected to a brake fluid reservoir container via an electrically operated outlet valve.

The setpoint pressure for the pressure supplying device is preferably predefined by an electronic open-loop and closed-loop control unit in which the braking request of the driver is determined when the brake pedal is activated, on the basis of at least one variable which is detected by sensor for example the brake pedal lift. The open-loop and closed-loop control unit particularly preferably also has a superordinate controller, in particular an anti-lock and/or vehicle movements dynamic controller which predefines the setpoint pressure. It is advantageous if this open-loop and closed-loop control unit also actuates the pressure supplying device.

BRIEF DESCRIPTION OF THE DRAWINGS

Further preferred embodiments of the invention can be found in the dependent claims and the following description with reference to the figures, in which:

DETAILED DESCRIPTION

Figure 1:
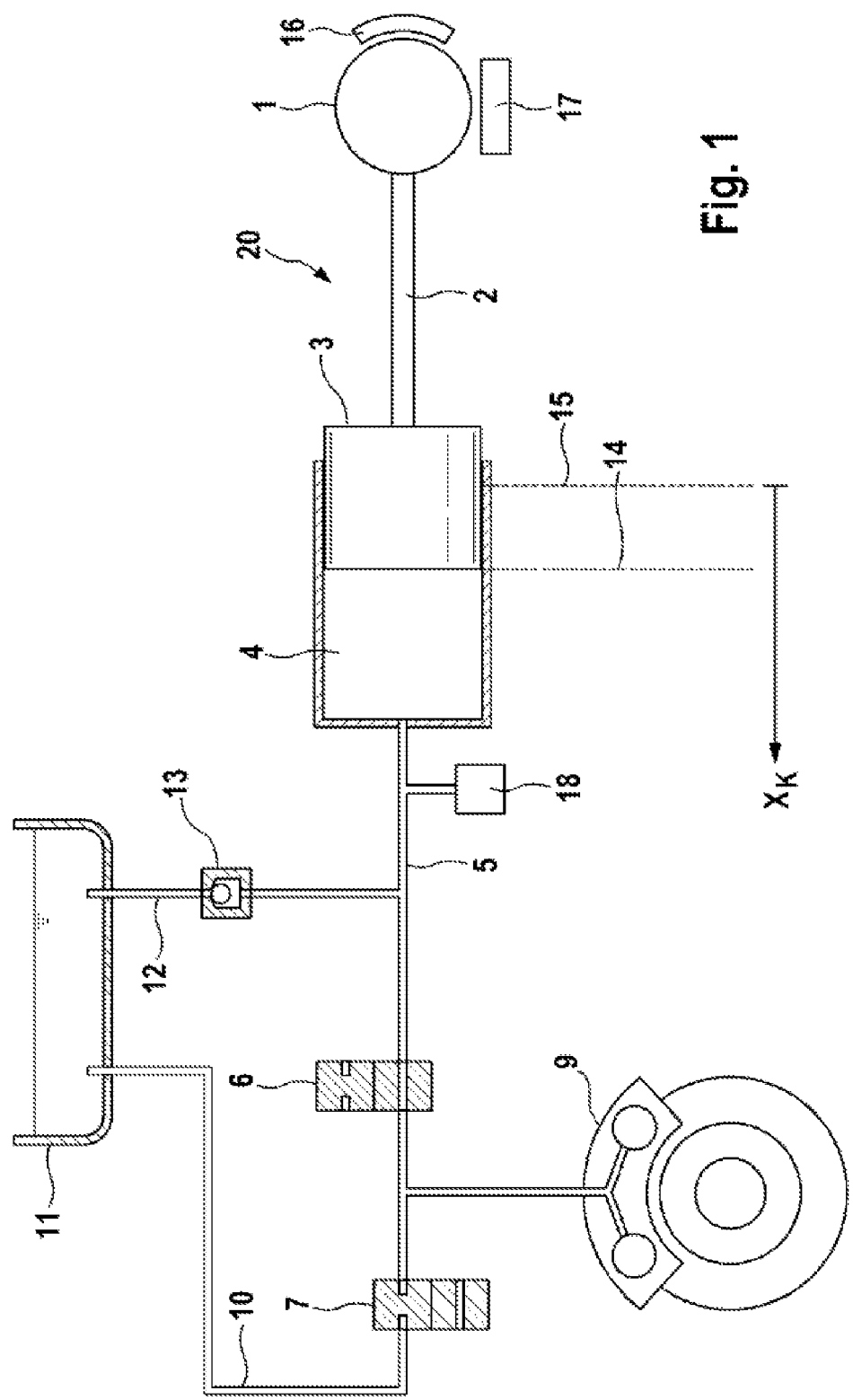
FIG. 1 shows a basic circuit diagram of an electrohydraulic brake system for carrying out a method according to the invention.

FIG. 1 shows a basic circuit diagram of an electrohydraulic brake system for a controllable wheel of a hydraulically braked vehicle in a schematic illustration. The brake system has a pressure supplying device 20, the pressure chamber 4 of which is connected via a hydraulic connecting line 5 to a wheel brake 9 which can be activated hydraulically. Arranged between the pressure chamber 4 and the wheel brake 9 is an inlet valve 6, which is, for example, open in the currentless state (i.e normally open type). The wheel brake 9 can be connected via a return line 10 to a pressure medium reservoir container 11. An outlet valve 7, which is, for example, closed in the currentless state (i.e. normally closed type), is advantageously arranged in the return line 10. In order to suck pressure medium into the pressure chamber 4 of the pressure supplying device 20, the pressure chamber 4 is connected to the pressure medium reservoir container 11. According to the example, a non-return valve (or check valve) 13 which opens in the direction of the pressure supplying device 20 is arranged in the hydraulic line 12 between the pressure chamber 4 and the pressure medium reservoir container 11.

The pressure supplying device 20 is formed according to the example by a cylinder-piston arrangement with a pressure chamber 4, wherein the pressure chamber 4 is bounded by a piston 3. The piston 3 can be moved by means of an electromechanical actuator, with the result that a desired pressure in the pressure chamber 4 can be generated. The electromechanical actuator has, according to the example, an electric motor 1 and a transmission 2, for example a rotational-translational transmission.

The brake system also has, according to the example, a pressure sensor 18 for measuring the pressure $P_V$ present in the pressure chamber 4.

Furthermore, the pressure system has a position sensor 16 for measuring an actuator position $\phi_{actr}$ and a means 17 for detecting an actuator torque $T_{actr}$. A motor angle position $\phi_{actr}$, for example a rotor position of the electric motor 1, is advantageously detected by means of sensor 16. A motor torque $T_{actr}$ is detected, for example, on the basis of measuring the motor current. The electric motor 1 is, for example, an electronically commutated motor. The motor torque $T_{actr}$ and the current motor angle position $\phi_{mot}$ are available as what are referred to as actuator signals for the method described further below for estimating the pressure.

If the driver makes a pressure request by means of a brake pedal activation, this request is electronically converted in the hydraulic pressure chamber 4 using the electric motor 1, the transmission 2 and the piston 3 by virtue of the fact that the piston 3 is moved into a position 14 by a distance $X_K$ from its position of rest 15. A certain volume of the pressure medium from the pressure chamber 4 is moved into the wheel brake 9 via the line 5 and the firstly opened inlet valve 6. As a result, a brake pressure is generated in the wheel brake 9. A brake pressure reduction can take place by virtue of the piston 3 being moved back again in the direction of the position of rest 15. A rapid reduction in brake pressure such as is required in the case of an anti-lock brake control process is, however, also possible by means of the valve combination 6 and 7 by virtue of the fact that the inlet valve 6 is closed and the outlet valve 7 is opened for a certain time. The pressure medium then flows out of the wheel brake 9 through the outlet valve 7 into the pressure medium reservoir container 11. This measure of the reduction of pressure is appropriate, in particular, when the pressure chamber 4 applies pressure to a plurality of wheel brakes 9.

FIG. 1 illustrates only a basic circuit diagram of an electrohydraulic brake system for carrying out a method according to the invention. Basically, the brake system can be extended by adding any desired number of wheel brakes 9 in that a plurality of lines 5 are led to the wheel brakes, wherein each wheel brake circuit preferably has a separate valve pair 6 and 7. In order to form multiple circuits of the brake system for safety reasons, a plurality of pistons 3 and a plurality of pressure chambers 4 can be provided in the pressure supplying device. For a passenger car with four wheel brakes 9 a dual circuit is appropriate, wherein in each case two wheel brakes 9 are connected to one of two pressure chambers 4.

Figure 2:
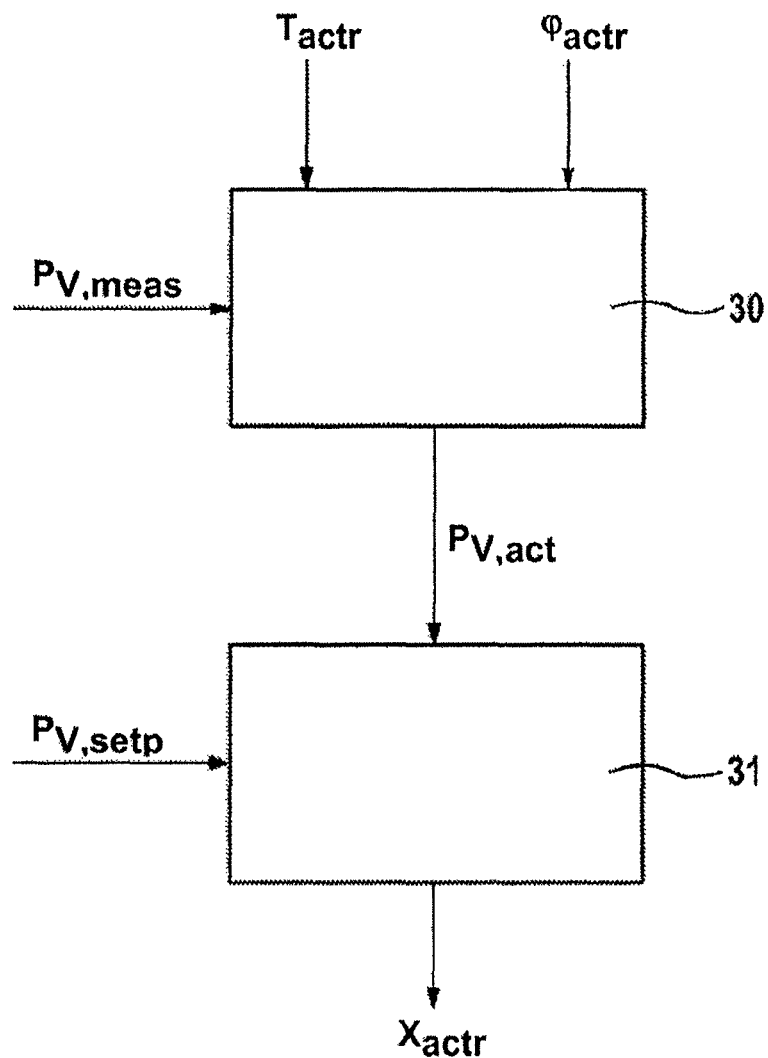
FIG. 2 shows a block circuit diagram of a first exemplary embodiment of a method according to the invention.

FIG. 2 is a block circuit diagram illustrating a first exemplary embodiment of a method according to the invention. A pressure value for the current pressure of the pressure chamber 4 is detected from a detected actuator torque $T_{actr}$ which is detected (for example measured or derived directly from measurement variables) and a detected actuator position $\phi_{actr}$ (for example measured or derived directly from measurement variables) using a pressure model in block 30 as a basis. This pressure value is then passed on as an actual pressure $P_{V,act}$ to a controller 31 which determines actuation signals $X_{actr}$ for the electromechanical actuator of the pressure supplying device 20 in order to set or adjust the actual pressure $P_{V,act}$ to a predefined setpoint pressure $P_{V,setp}$.

The method according to the example therefore has a model-based detection (block 30) of pressure information (actual pressure $P_{V,act}$) on the basis of the motor variables of the actuator torque $T_{actr}$ and the actuator position $\phi_{actr}$. The pressure information $P_{V,act}$ is then used to set/adjust pressures or pressure profiles of the pressure supplying device 20 by means of the immersion piston 3 which is driven by an electric motor.

In order to directly detect the pressure value $P_V$ in the hydraulic pressure chamber 4, a pressure sensor (see for example pressure sensor 18 in FIG. 1) can be used which, however, has a finite pressure measuring range. Accordingly, only pressures between zero and the measuring range end value $P_{meas,max}$ can be measured by means of the pressure sensor ($0 \leq P_{V,meas} \leq P_{meas,max}$). If it then becomes necessary to set pressures beyond this pressure measuring range, that is to say $P_{V,setp} > P_{meas,max}$, on the basis of the setpoint pressure predefinition $P_{V,setp}$, using the electric motor 1, the current pressure of the pressure supplying device $P_V$ can be calculated from the actuator torque $T_{actr}$ and the actuator position $\phi_{actr}$ on the basis of the pressure model and can be used for control.

As is apparent from FIG. 2, according to the example the measured pressure $P_{V,meas}$ is also taken into account in block 30. The measured pressure $P_{V,meas}$ can be included in the calculation of the actual pressure $P_{V,act}$ and/or in a determination or adaptation of one or more parameters of the pressure model. An example of the calculation of the actual pressure $P_{V,act}$ and an example of a pressure model are explained in more detail below.

The exemplary model takes into account the components described in FIG. 1 of the electric motor 1, transmission 2 and immersion piston 3 in a hydraulic pressure chamber 4. The model describes the static and dynamic behavior of the motor 1, which sets a corresponding motor torque $T_{actr}$ in order to generate the requested pressure $P_{V,setp}$ in the pressure chamber 4. The model can be described by the following equation (1):

$$J \cdot d\omega_{actr}/dt = T_{actr} - T_{hydr} - d \cdot \omega_{actr} - (M_c + \alpha \cdot T_{hydr}) \cdot \text{sign}(\omega_{actr})$$

where

J: the overall moment of mass inertia to be overcome by the electric motor 1, $\omega_{actr}$: the motor angle speed which can be determined from the motor angle position $\phi_{actr}$ by differentiation, $d\omega_{actr}/dt$: derivation of the motor angle speed over time, $T_{actr}$: the motor torque, d: a damping constant, $M_c$: the constant friction component which is dependent on the direction of rotation of the motor 1, $T_{hydr}$: the torque which occurs on the basis of the hydraulic pressure $P_V$, applied by the motor 1, in the pressure chamber 4, and acts as a load torque on the electric motor 1, α: factor, which takes into account the influence of the load torque $T_{hydr}$ on the static constant friction component $M_c$ which is dependent on the direction of rotation of the motor, sign: sign function.

The torque $T_{hydr}$ depends on the pressure $P_V$:

$$T_{hydr} = f(P_V), \quad (2)$$

wherein the dependency function f is determined essentially by the transmission ratio of the transmission 2 and the cross section of the immersion piston 3.

In a simple case, the function f can be described by a proportional relationship with a proportionality constant $$T_{hydr} = K_1 \cdot P_V \quad (3)$$

In order to be able to use the model described above appropriately for determining the pressure $P_V$, the parameters used in the model should be known sufficiently precisely. However, in this context the parameters which describe the behavior of the friction are subject to certain changes which arise essentially owing to ambient conditions, variation and wear.

Therefore, the parameters which represent the friction are advantageously detected or corrected in the pressure ranges in which a valid pressure signal $P_{V,meas}$ which lies within the measuring range is present. For this purpose, in addition to the measured pressure signal $P_{V,meas}$ the detected motor torque $T_{actr}$ and the measured motor angle position $\phi_{actr}$ are used. If the pressure which is to be set in the hydraulic pressure chamber 4 is outside the measuring range $P_{meas,max}$, pressure information $P_{V,act}$ is detected in a model-based fashion and set by means of the controller 31 by means of the corrected parameter and the still detectable variables of the motor torque $T_{actr}$ and motor angle position $\phi_{actr}$.

A model corresponding to equation (1) is used as the basis, thus the parameters which are to be updated during ongoing operation are the constant friction component $M_c$ which is dependent on the direction of rotation of the motor and the factor α which represents the influence of the load torque on $M_c$.

In the text which follows, (estimated) values of the parameters $M_c$ and α which are detected or corrected during operation are designated as $M_{c,est}$ and $\alpha_{est}$.

Assuming that the parameters of the pressure model are known (for example parameters J and d are permanently predefined, the parameters $M_{c,est}$ and $\alpha_{est}$ represent the values, adapted to the current conditions, for the parameters $M_c$ and α), a pressure value $P_{V,est}$ corresponding to the equations (1) and (2) can be calculated as follows from the detected motor torque $T_{actr}$ and the measured motor angle position $\phi_{actr}$:

$$P_{V,est} = f^{-1}(T_{hydr,est}) \quad (4)$$

where $$T_{hydr,est} = \frac{T_{actr} - J \cdot \dfrac{d\omega_{actr}}{dt} - d \cdot \omega_{actr} - M_{c,est} \cdot \text{sign}(\omega_{actr})}{(1 \cdot \alpha_{est}) \cdot \text{sign}(\omega_{actr})} \quad (5)$$

Here, $f^{-1}$ is the reverse function of the function f of equation (2). For the simple case according to equation (3) the following applies:

$$P_{V,est} = T_{hydr,est}/K_1 \quad (6)$$

The index "est" characterizes here that the signals $P_{V,est}$ and $T_{hydr,est}$ are model signals which are calculated from motor signals.

In order to determine or update the variant parameters $M_{c,est}$ and $\alpha_{est}$, according to the example the deviation e in-between the detected (measured) motor torque $T_{actr}$ and the motor torque $T_{actr,est}$ calculated on the basis of the model in equation (1) is considered:

$$e = T_{actr} - T_{actr,est} \quad (7)$$

where $$T_{actr,est} = J \cdot d\omega_{actr}/dt + T_{hydr} + d \cdot \omega_{actr} + (M_{c,est} + \alpha_{est} \cdot T_{hydr}) \cdot \text{sign}(\omega_{actr}) \quad (8)$$

The torque $T_{hydr}$ is determined according to equation (2) or specifically equation (3) from the measured pressure $P_{V,meas}$.

Since both parameters $M_{c,est}$ and $\alpha_{est}$ depend on the direction of rotation of the actuator speed sign ($\omega_{actr}$), known parameter estimation methods which are based on minimizing a quadratic quality criterion cannot be applied appropriately. Therefore, in each controller loop only one parameter is preferably ever corrected or adapted depending on the situation, wherein the correction/change is made in small and fixed increments. The decision as to which parameter is to be currently adapted depends, according to the example, on the pressure $P_V$ which is present during the braking operation and therefore on the value $T_{hydr}$. If the torque $T_{hydr}$ is lower than a predefined limiting value $T_{hydr,1}$ ($0 < T_{hydr} < T_{hydr,1}$), it is assumed that the deviation e (see equation (7)) is mainly caused by the parameter $M_c$, and this parameter is then corrected by a (predefined) value $\Delta M_{c,corr}$. In the case of relatively high pressure values $P_V$, the influence of the load torque $T_{hydr}$ on the friction which is dependent on the direction of rotation increases, with the result in this case that the parameter $\alpha$ is corrected by a predefined value $\Delta\alpha_{corr}$.

According to one advantageous exemplary embodiment, a correction value, for example the correction value $\Delta\alpha_{corr}$ can also be selected/predefined as a function of the value of the deviation e (see equation (7)). For example two limiting values $e_1$ and $e_2$ can be predefined for the deviation e, with the result that the correction value $\Delta\alpha_{corr}$ is then selected for the parameter $\alpha_{est}$ as follows:

for $0 < |e| < e_1$: $\Delta\alpha_{corr} = \Delta\alpha_{corr,1}$ for $e_1 < |e| < e_2$: $\Delta\alpha_{corr} = \Delta\alpha_{corr,2}$ for $e_2 < |e|$: $\Delta\alpha_{corr} = \Delta\alpha_{corr,3}$ (9)

Additionally or alternatively, a corresponding procedure can be adopted for the correction values of the parameter $M_{c,est}$.

According to a further exemplary embodiment of a method according to the invention, two threshold values $P_1$ and $P_2$ as well as a third threshold value $P_{meas,max} - \Delta P$ are predefined (as a function of the measuring range end value $P_{meas,max}$) for the pressure value of the pressure supplying device, wherein the following applies:

$$0 < P_1 \leq P_2 < P_{meas,max} - \Delta P < P_{meas,max} \quad (10)$$

The third threshold value $P_{meas,max} - \Delta\Delta P$ is, according to the example, lower than the measuring range end value $P_{meas,max}$ by an amount equal to a safety pressure difference $\Delta P$. The safety pressure difference $\Delta P$ is, for example, in the range of several bar.

If the pressure $P_{V,meas}$ which is measured by means of the pressure sensor is lower than or equal to the first threshold value $P_1$ ($P_{V,meas} \leq P_1$), the variant parameters are detected or corrected in accordance with the description above, and otherwise ($P_{V,meas} > P_1$) all the model parameters are maintained in their current state and a model-based detection of the pressure value $P_{V,est}$ is performed on the basis of the actuator signals of the motor torque $T_{actr}$ and motor angle position $\phi_{actr}$, for example according to equations (4) and (5) and the associated description.

With respect to the provision of pressure information $P_{V,act}$ for the controller 31, the following procedure is adopted, according to the example: as long as the pressure signal $P_{V,meas}$ which can be measured by means of the pressure sensor is lower than or equal to the second threshold value $P_2$ ($P_{V,meas} \leq P_2$, region A), the pressure actual value $P_{V,act}$ is specified by the measured pressure value $P_{V,meas}$, that is to say $$P_{V,act}^A = P_{V,meas}.$$

In the region B, when the measured pressure $P_{V,meas}$ is higher than the second threshold value $P_2$ and lower than the third threshold value $P_{meas,max} - \Delta P$ ($P_2 < P_{V,meas} < (P_{meas,max} - \Delta P)$), a transitional consideration, during which both available pressure information items, specifically the measured pressure $P_{V,meas}$ and the pressure value $P_{V,est}$ which is calculated from the actuator torque $T_{actr}$ and actuator position $\phi_{actr}$ are used to detect the pressure actual value $P_{V,act}$ in a weighted fashion:

$$P_{V,act}^B = \lambda \cdot P_{V,meas} + (1-\lambda) \cdot P_{V,est}$$

The weighting factor $\lambda$ is advantageously determined from the interval between the measured pressure signal $P_{V,meas}$ and its measuring range end value $P_{meas,max}$, and this is given, for example, by the following relationship:

$$\lambda = (P_{meas,max} - \Delta P - P_{V,meas})/(P_{meas,max} - \Delta P - P_2)$$

If the measured pressure $P_{V,meas}$ is above the third threshold value $P_{meas,max} - \Delta P$ (in the region C, $P_{V,meas} \geq (P_{meas,max} - \Delta P)$), the estimated value $P_{V,est}$ (calculated from the actuator torque $T_{actr}$ and actuator position $\phi_{actr}$, for control is fed to the pressure controller 31 as pressure information, that is to say $$P_{V,act}^C = P_{V,est}.$$

The pressure signal $P_{V,est}$ which is obtained from the motor signals $T_{actr}$, $\phi_{actr}$ is advantageously also supplied if a failure of the pressure sensor has been detected on the basis of a monitoring function. The pressure control and therefore the supply of a desired pressure of the pressure supplying device continues to be performed for a certain time period and, if appropriate, with reduced comfort and reduced dynamics on the basis of the model parameters which are detected or corrected with valid pressure sensor values $P_{V,meas}$ up to the failure, in that the estimated pressure value $P_{V,est}$ is used for the control ($P_{V,act} = P_{V,est}$).

While the above description constitutes the preferred embodiment of the present invention, it will be appreciated that the invention is susceptible to modification, variation, and change without departing from the proper scope and fair meaning of the accompanying claims.

The invention claimed is:

1. A method for operating a motor vehicle brake system comprising an electrically controllable pressure supplying device for hydraulically activating at least one wheel brake, wherein the pressure supplying device includes a cylinder-piston arrangement with a hydraulic pressure chamber, and a piston which can be moved by an electromechanical actuator in order to generate a predefineable setpoint pressure in the hydraulic pressure chamber, wherein the hydraulic pressure chamber is defined by the cylinder-piston arrangement, the method comprising the steps of:

detecting an actuator torque, and an actuator position, of the electromechanical actuator by means of an electronic open-loop and closed-loop control unit, determining an estimated pressure value for a pressure in the hydraulic pressure chamber using the actuator torque and the actuator position taking into account a pressure model, setting or adjusting a pressure in the hydraulic pressure chamber;

using the estimated pressure value, which is determined using the actuator torque and the actuator position, as an actual pressure for setting or adjusting the pressure in the hydraulic pressure chamber to the predefineable setpoint pressure, wherein the pressure supplying device is actuated by means of the electronic open-loop and closed loop control unit.

2. The method as claimed in claim 1 further comprising detecting a measured pressure in the hydraulic pressure chamber by means of providing a pressure sensor, at least temporarily or when a condition is met.

3. The method as claimed in claim 2 further comprising using the measured pressure as an actual pressure for setting or adjusting the pressure in the hydraulic pressure chamber to the setpoint pressure as long as the measured pressure is lower than or equal to a second threshold value, wherein the second threshold value is higher than or equal to a first threshold value.

4. The method as claimed in claim 2 further comprising determining the estimated pressure value from the actuator torque and the actuator position on the basis of the pressure model.

5. The method as claimed in claim 4 further comprising using the estimated pressure value, which is determined from the actuator torque and the actuator position on the basis of the pressure model, as an actual pressure for setting or adjusting the pressure in the hydraulic pressure chamber to the setpoint pressure if the measured pressure is higher than a third threshold value that is higher than a second threshold value, the second threshold value being equal or higher than a first threshold value.

6. The method as claimed in claim 4 further comprising using the estimated pressure value, which is determined from the actuator torque and the actuator position on the basis of the pressure model, as an actual pressure for setting or adjusting the pressure in the hydraulic pressure chamber to the setpoint pressure if a failure of the pressure sensor is detected or there is no measured pressure available.

7. A method for operating a motor vehicle brake system comprising an electrically controllable pressure supplying device for hydraulically activating at least one wheel brake, wherein the pressure supplying device includes a cylinder-piston arrangement with a hydraulic pressure chamber, and a piston which can be moved by an electromechanical actuator in order to generate a predefineable setpoint pressure in the hydraulic pressure chamber, the method comprising the steps of:

detecting an actuator torque, and an actuator position, of the electromechanical actuator, determining an estimated pressure value for a pressure in the hydraulic pressure chamber using the actuator torque and the actuator position taking into account a pressure model, setting or adjusting a pressure in the hydraulic pressure chamber, using the estimated pressure value, which is determined using the actuator torque and the actuator position, as an actual pressure for setting or adjusting the pressure in the hydraulic pressure chamber to the predefineable setpoint pressure;

detecting a measured pressure in the hydraulic pressure chamber by means of providing a pressure sensor, at least temporarily or when a condition is met, and determining or adapting at least one parameter of the pressure model on the basis of the measured pressure, the detected actuator torque and the detected actuator position.

8. The method as claimed in claim 7, further comprising:

determining or adapting the at least one parameter of the pressure model if the measured pressure is lower than or equal to a first threshold value, and maintaining the at least one parameter of the pressure model if the measured pressure is higher than the first threshold value.

9. The method as claimed in claim 7 wherein, in response to determining or adapting the parameters of the pressure model, changing only one of the parameters at a time or in a time interval, wherein the extent of the change of the parameter is predefined.

10. A method for operating a motor vehicle brake system comprising an electrically controllable pressure supplying device for hydraulically activating at least one wheel brake, wherein the pressure supplying device includes a cylinder-piston arrangement with a hydraulic pressure chamber, and a piston which can be moved by an electromechanical actuator in order to generate a predefineable setpoint pressure in the hydraulic pressure chamber, the method comprising the steps of:

detecting an actuator torque, and an actuator position, of the electromechanical actuator, determining an estimated pressure value for a pressure in the hydraulic pressure chamber using the actuator torque and the actuator position taking into account a pressure model, setting or adjusting a pressure in the hydraulic pressure chamber, using the estimated pressure value which is determined using the actuator torque and the actuator position, as an actual pressure for setting or adjusting the pressure in the hydraulic pressure chamber to the predefineable setpoint pressure;

detecting a measured pressure in the hydraulic pressure chamber by means of providing a pressure sensor, at least temporarily or when a condition is met, determining the estimated pressure value from the actuator torque and the actuator position on the basis of the pressure model, calculating an actual pressure value from the measured pressure and the estimated pressure value which is determined from the actuator torque and the actuator position on the basis of the pressure model, and using the actual pressure value as an actual pressure for setting or adjusting the pressure in the hydraulic pressure chamber to the predefineable setpoint pressure, if the measured pressure is higher than a second threshold value that is equal or higher than a first threshold value and if the measured pressure is lower than a third threshold value.

11. The method as claimed in claim 10, further comprising calculating the actual pressure value by weighted averaging with a weighting factor from the measured pressure and the determined estimated pressure value, wherein the weighting factor is selected as a function of the measured pressure and a measuring range end value of the pressure sensor.

12. The method as claimed in claim 10 wherein the third threshold value is selected to be lower than a measuring range end value of the pressure sensor.

13. A motor vehicle brake system, comprising:
- at least one wheel brake which can be activated hydraulically, and
- a pressure supplying device which can be actuated by means of an electronic open-loop and closed-loop control unit and by means of which the brake can be activated hydraulically,
- wherein the pressure supplying device has a cylinder-piston arrangement with a hydraulic pressure chamber, and a piston of which can be moved by an electromechanical actuator in order to generate a predefineable setpoint pressure in the hydraulic pressure chamber, wherein the brake system further comprises:
- a pressure sensor for measuring a pressure in the hydraulic pressure chamber and a position sensor for measuring an actuator position, of the electromechanical actuator,
- a means for determining an actuator torque, of the electromechanical actuator, and
- wherein the electronic open-loop and closed-loop control unit is configured to detect the actuator torque, and the actuator position, of the electromechanical actuator and configured to determine a pressure value for the pressure in the hydraulic pressure chamber using the actuator torque and the actuator position taking into account a pressure model.

* * * * *